Sept. 17, 1957     J. K. WOLFE     2,806,817
ELECTROLYTIC FLUORINATION OF ORGANIC COMPOUNDS
Filed Aug. 6, 1953
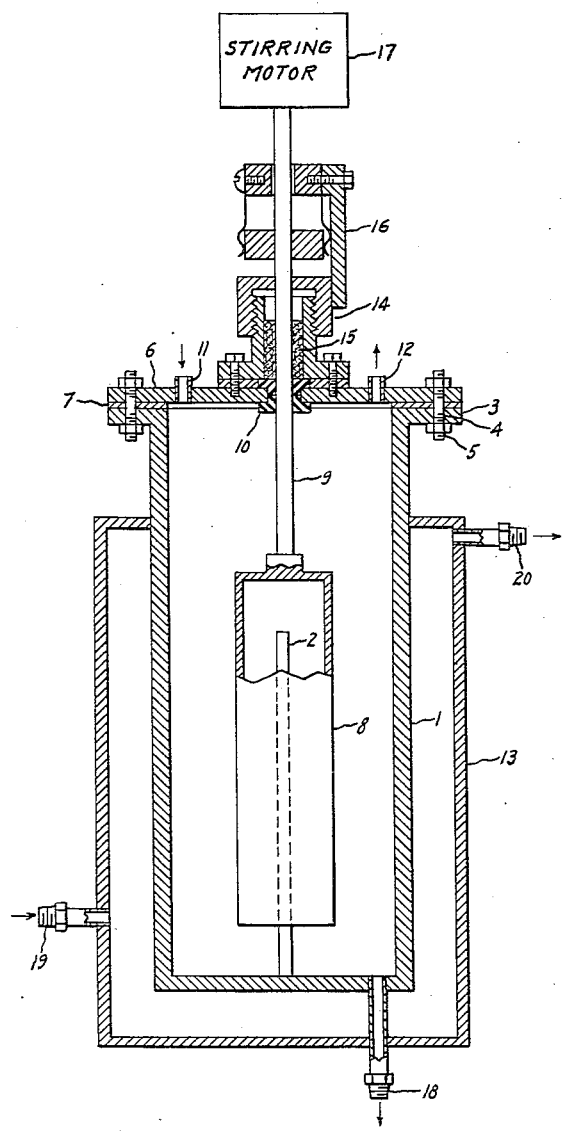
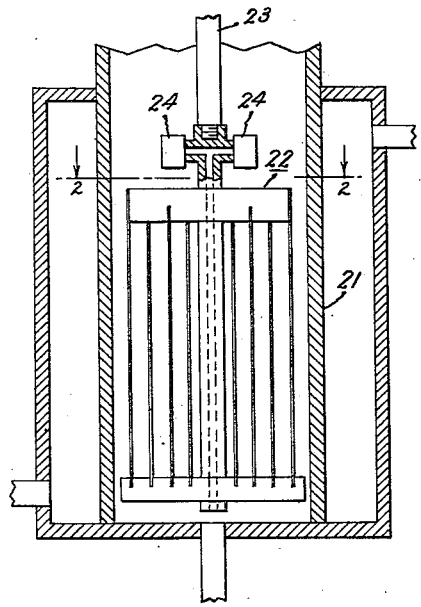
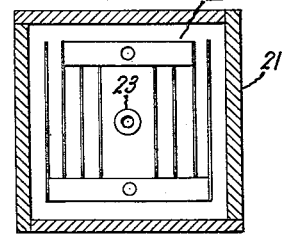
Inventor:
John K. Wolfe,
by   *Abraham Cohen*
His Attorney.

United States Patent Office 2,806,817
Patented Sept. 17, 1957

2,806,817

ELECTROLYTIC FLUORINATION OF ORGANIC COMPOUNDS

John K. Wolfe, Burnt Hills, N. Y., assignor to General Electric Company, a corporation of New York Application August 6, 1953, Serial No. 372,777

11 Claims. (Cl. 204—59)

This invention relates to the preparation of fluorinated organic compounds and is more particularly concerned with a process of preparing fluorine-containing compounds from fluorinatable hydrogen-containing organic compounds and particularly from chlorinated organic compounds containing a carbon-bonded hydrogen, which process comprises electrolyzing the latter compound, while vigorously agitating the reaction mixture, with hydrogen fluoride under anhydrous conditions to give a compound containing a carbon-bonded fluorine in place of the carbon-bonded hydrogen.

One of the objects of this invention is to prepare easily and economically organic compounds which are both fluorinated and chlorinated.

A still further object of the invention is to prepare easily various fluorochlorohydrocarbons which have heretofore been prepared only with the greatest difficulty.

Other objects of the invention will become more apparent as the description thereof proceeds.

Because of its position in the electromotive series, it has been believed that fluorine will replace chlorine before it will replace hydrogen where both the chlorine and the hydrogen are attached to carbon atoms in the same chemical compound. This order of replacement was more expected where severe conditions employing hydrogen fluoride were used in connection with chlorohydrocarbons.

Unexpectedly, and as I have disclosed previously in my earlier issued Patent 2,601,014, assigned to the assignee of the present invention, I have discovered that I can introduce fluorine into a chlorinated organic compound containing a carbon-bonded hydrogen and substitute the hydrogen first with fluorine and obtain under some conditions only partial removal of chlorine. By means of my invention it is possible to obtain substantial yields of fluorochloro-organic compounds in which no chlorine has been replaced with fluorine. It is believed that the removal of chlorine from the type of chlorinated organic compounds concerned in this invention occurs in stepwise fashion and that the partial replacement of chlorine with fluorine is a secondary reaction on the products formed. In the case of unsaturated chlorohydrocarbons containing a carbon-bonded hydrogen, these stepwise reactions have now unexpectedly been found to involve a primary step of addition rather than substitution as follows:

Step 1.—Addition of fluorine to the double bond

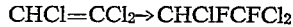

Step 2.—Replacement of hydrogen with fluorine

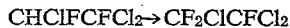

Step 3.—Further fluorination reactions

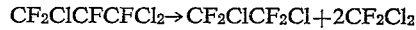

Surprisingly, I have now discovered that prior art methods of electrolytic fluorinations, including for instance the methods of my previously issued patent and Simons Patent 2,519,983 can be improved appreciably and yields increased substantially by stirring or agitation of the reaction mixture during the electrochemical process.

In accordance with my invention, a mixture of the fluorinatable organic compound containing carbon-bonded hydrogen and anhydrous hydrogen fluoride is prepared and an electric current put through the mixture using an electrolysis cell as the reaction zone while inducing stirring or other agitation of the reaction mixture. In carrying out the reaction, I have found it desirable to employ an electrolyte such as, for instance, anhydrous lithium fluoride, etc., in the cell to facilitate the reaction. Although an electrolyte is desirable, it may be omitted with longer reaction periods required to obtain the same degree of conversion.

Cells employing appropriate stirring or agitating means which I have found to be eminently suited for the reactions of my invention are illustrated in the accompanying drawing forming a part of the specification hereof and in which:

Fig. 1 is a view partly in elevation and partly in section showing a preferred form of cell for carrying out the reactions;

Fig. 2 is a similar fragmentary view of a modification; and

Fig. 3 is section taken on line 2—2 of Fig. 2.

Referring to Fig. 1, in which the outer casing 1 of the cell, which is the cathode in the cell and is made of welded, cold rolled steel, has attached to it a thin rod 2 extending upwardly from the center of the bottom of the casing. The casing is formed with a flange 3 provided with a series of holes 4 through which fastening means 5 clamp in place the cover 6 of the cell casing. An inert ring 7, preferably made from polytetrafluoroethylene or polychlorotrifluoroethylene, is used as a gasket to act as a seal between the cover and the the casing.

The anode 8 comprises a nickel cylinder rotatably connected to a rotatable positioning shaft 9 which is electrically insulated from cell cover 6 by means of, preferably, polytetrafluoroethylene bushings 10 and which externally to the cell is partially supported in position by a stuffing box 14 packed with shredded polytetrafluoroethylene 15 and directly connected to a stirring motor 17. A copper anode contactor is represented by 16. Means for cooling the cell is provided by coolant jacket 13 having an inlet 19 and an outlet 20. A sealable inlet port 11 is provided in cover 6 for introduction of starting materials and an outlet port 12 is also provided for the escape of gaseous products. Outlet 18 is provided for cell drainage.

Another cell useful in a further embodiment of my invention is illustrated in Figs. 2 and 3. Fig. 2 is illustrative of a cell having a cathode assembly 21, a stationary anode assembly 22 comprising a series of parallel plates, in which cell agitation of the reaction mixture is accomplished by means of a series of paddles 24 mounted on a hollow rotatable shaft 23 which is operatively connected to a driving mechanism such as an electric motor. The centrifugal force of the rotating blades causes a flow of reactants up through hollow shaft 23 to paddles 24 which in turn uniformly disperse the reactants throughout the cell. All other features of design are essentially the same as those of Fig. 1.

In practicing the preferred embodiment of my invention, a cell as shown in Fig. 1 is filled preferably to a level above the top of the anode with anhydrous hydrogen fluoride. The anhydrous electrolyte, for instance, anhydrous lithium fluoride, is then introduced and thoroughly mixed with the hydrogen fluoride to form a homogeneous solution. The anhydrous electrolyte may, of course, be added before the cell cover is put in place, and the hydrogen fluoride added through the inlet port of the cover. The fluorinatable organic compound containing the carbon-bonded hydrogen is then introduced through the inlet port in the cover of the cell casing, the cover being completely closed thereafter with the exception of another port for the removal of gaseous reaction products. Thereafter, enough current is passed through the cell during the electrolysis to obtain the desired conversion of the starting materials. During addition of the reactants and throughout the reaction period, the reaction mixture is completely and thoroughly stirred by means of the previously described rotatably mounted anode. The rotary speed of the anode will, of course, depend upon the size of the cell, the diameter of the anode as well as upon other factors.

The conditions under which the reaction may be conducted can be varied within wide limits without departing from the scope of the invention. Generally, when the reaction is conducted at atmospheric pressure, I advantageously employ temperatures of the order of from about $-78°$ C. to $+19°$ C., preferably from $-35°$ C. to $+10°$ C. As a result of my work, the evidence indicates that the lower the temperature used during the reaction, the more complete is the replacement of hydrogen with the fluorine and the amount of decomposition is minimized. The wholly unexpected advantage of agitating the reaction mixture will become more apparent as the description proceeds.

The amperage and voltage used in the electrolysis reaction may also be varied for different lengths of time. I have found it advantageous to use from about 3 to 7 volts during my claimed process. The amperage in the cell depends on the conducting surface area of the anode, the nature of the electrolyte, and the solubilities of the electrolyte with the fluorinatable organic compound in the anhydrous hydrogen fluoride. It is also apparent that the amperage will depend largely on the size of the cell components. The time within which the electrolysis is conducted will vary depending upon the above-stated factors and degree of conversion desired. As will be obvious to those skilled in the art, all these conditions may be modified without departing from the scope of the claimed invention. The gaseous products of the reaction, together with the formed hydrogen, are passed through various absorbing, scrubbing and other purifying agents. The gaseous products are advantageously collected in a low temperature trap, for instance, Dry Ice (solid carbon dioxide) and liquid air traps. Distillation of the reaction products to separate the individually formed components may be made through a low temperature distillation column, e. g., a Podbielniak column.

To insure that the hydrogen fluoride is substantially anhydrous, an independent electrolysis is conducted in the cell with electrolyte and commercial anhydrous hydrogen fluoride alone, prior to the admission of the fluorinatable compound. A voltage of from 6 to 10 volts is impressed across the cell until substantially all traces of moisture are removed as $OF_2$ and hydrogen, and molecular fluorine can be detected in the effluent gases.

In order that those skilled in the art better may understand how the present invention may be practiced, the following examples are given by way of illustration and not by way of limitation. All parts and percentages are by weight.

EXAMPLE 1

The cell described in Fig. 1 of the accompanying drawings was charged with the following ingredients:

|  | Parts |
| --- | --- |
| Anhydrous HF | 800 |
| $CHCl=CCl_2$ | 725 |
| Anhydrous NaF | 13 |

The temperature within the cell was maintained at around $0°$ C. The cell was electrolyzed using about 6.0 volts, while the amperage ranged from approximately 1.5–2.5 amperes. Current was maintained at these values for approximately 150 ampere hours or until approximately half of the starting $CHCl=CCl_2$ had reacted. During the course of the entire reaction, the anode was rotated at a speed of approximately 240 R. P. M. The products of the reaction, together with the hydrogen formed, were passed over solid sodium fluoride pellets, bubbled through an aqueous sodium sulfite solution containing potassium iodide, and finally through concentrated sulfuric acid. The reaction products were then collected in Dry Ice and liquid air traps from which all the formed hydrogen escaped. A portion of the product remained in the cell and was later drained, separated from the HF and analyzed. Approximately 50 percent of the reaction product was recovered as unreacted $$CHCl=CCl_2$$

and yields reported are based on trichloroethylene converted. A mixed reaction product boiling below $70°$ C. and comprising approximately 75 percent of product recovered was composed of 67 percent $CHFClCFCl_2$, 22 percent $CF_2ClCFCl_2$, and 11 percent of various decomposition products.

EXAMPLE 2

In this example the identical materials and conditions were employed as in Example 1 with the exception that the rotating speed of the anode was increased to 1000 R. P. M. Increasing the anode speed to this value had a marked effect on the quantity of primary product boiling below $70°$ C., $CHFClCFCl_2$, obtained as well as on the secondary and tertiary products as follows:

|  | Percent |
| --- | --- |
| $CHFClCFCl_2$ | 82 |
| $CF_2ClCFCl_2$ | 12 |
| Decomposition | 6 |

EXAMPLE 3

In this example, Examples 1 and 2 were duplicated under static conditions or, in other words, with a stationary anode. The results of this run along with the results of Examples 1 and 2 are summarized below in Table I.

*Table I*

| Reaction State | Percent product Static | Percent product at 240 R. P. M. | Percent product at 1,000 R. P. M. |
| --- | --- | --- | --- |
| 1st Step: $CHFClCFCl_2$ | 50 | 67 | 82 |
| 2nd Step: $CF_2ClCFCl_2$ | 30 | 22 | 12 |
| 3rd Step: Decomposition | 20 | 11 | 6 |

The data listed in Table I clearly illustrates the increased yields of primary reaction products, and the smaller quantities of less desirable secondary and decomposition products obtained when electrolysis is attended by anode rotation as in the practice of my invention. At both low and high speed anode rotation the increase in the yields of primary products is substantial and was entirely unpredictable.

EXAMPLE 4

Employing the cell described in Fig. 1, this example illustrates the effect of electrolyzing $CH_2Cl_2$. The temperature was maintained at around $-10°$ C. and the cell was electrolyzed at approximately 6.0 volts, at a current density of 1.0 ampere/dm.$^2$, until a total of 3.0 faradays were passed. The electrical energy efficiency of this electrolysis was calculated as 85 percent. During the electrolysis the anode was rotated at a moderate speed and the charge in the electrolytic cell was as follows:

|  | Parts |
| --- | --- |
| $CH_2Cl_2$ | 3.53 |
| HF | 51.4 |
| LiF | .39 |

The reaction products were passed over the purifying train previously described and were collected in Dry Ice and liquid air traps. After recovering 2.17 parts of unreacted $CH_2Cl_2$ the remainder of the product mixtures had the analysis shown in Table II.

*Table II*

| Product | M. W. | Grams Product per 1,000 Ampere Hours | Percent of Total |
|---|---|---|---|
| $CHF_2Cl$ | 86.5 | 68 | 6.3 |
| $CF_2Cl_2$ | 121 | 93 | 8.7 |
| $CH_2FCl$ | 68.5 | 126 | 11.9 |
| $CHFCl_2$ | 103 | 669 | 63.1 |

The results of this example again clearly show that fluorine can be introduced into a chloro-organic compound containing a carbon-bonded hydrogen by replacing hydrogen before chlorine as evidenced by the large proportion of the initially formed product $CHFCl_2$.

EXAMPLE 5

This example was conducted under static conditions for the purpose of comparing the results with that obtained with anode rotation in Example 4.

The temperature was maintained at $-10°$ C. and the cell was electrolyzed at approximately 6.0 volts, at a current density of 0.81 ampere/dm.$^2$ until 3.12 faradays were passed. The electrical energy efficiency of this electrolysis was calculated as 66 percent. The charge in the electrolytic cell was as follows:

| | Parts |
|---|---|
| $CH_2Cl_2$ | 2.9 |
| HF | 43.5 |
| LiF | 0.31 |

1.4 parts of unreacted $CH_2Cl_2$ were recovered from the reaction products, the balance of which analyzed as shown in Table III, the calculation of yields being based on the quantity of $CH_2Cl_2$ reacted.

*Table III*

| Product | M. W. | Grams Product per 1,000 Ampere Hours | Percent of Total |
|---|---|---|---|
| $CHF_2Cl$ | 86.5 | 96.0 | 13.4 |
| $CF_2Cl_2$ | 121 | 82.0 | 11.5 |
| $CH_2FCl$ | 68.5 | 65.3 | 9.2 |
| $CHFCl_2$ | 103 | 338.0 | 47.4 |

Comparison of the results embodied in Table III with the data listed in Table II for a stirred electrolysis clearly shows a substantially higher yield of 1st step product, $CHFCl_2$, for the stirred electrolysis of Example 4.

EXAMPLE 6

The cell described in Fig. 1 was charged with the following reactants:

| | Parts |
|---|---|
| Substantially anhydrous HF | 500 |
| Dried pyridine | 400 |

The temperature was maintained at 0° C. Additional pyridine was added as the run progressed to make 1000 parts. Current was passed for 48 hours at an average cell voltage of approximately 6.0 volts and the anode was rotated throughout the reaction. A total of 200 faradays was passed.

The liquid product mixture was drained and treated with lime to remove residual HF and fractionally distilled. From the reaction products, approximately 200 grams were obtained of a product identified as substantially pure $C_5F_{10}NF$, undecafluoropiperidine. The amounts of $C_5F_{12}$ and $NF_3$ recovered in this experiment were substantially lower than those found in static electrode electrolysis of the same starting compound. Additionally, a larger yield of partially fluorinated products retaining hydrogen was found.

EXAMPLE 7

The cell described in Fig. 2 was charged with the following ingredients:

| | Parts |
|---|---|
| Substantially anhydrous HF | 500 |
| n-Octane | 150 |
| Water | 10 |

Electrolysis proceeded during a ten-day run period. Additional liquid HF, approximately 400 parts, and small amounts of water were added as necessary during the aforesaid period to maintain the conductivity of the mixture. The cell voltage was maintained at approximately 6.5 volts and the cell current at approximately 2 amperes. Stirring of the reaction mixture was accomplished by rotating the described bladed shaft at a moderate speed.

Fractionation of the product mixture showed that the octane had been converted to fluorocarbons of which more than one-half was $C_8F_{18}$. This is a greater amount of this product than is obtained in a static system. The quantities of lower boiling fluorocarbons, $C_7F_{16}$, $C_6F_{14}$, etc. were smaller than obtained in a corresponding static electrolysis.

EXAMPLE 8

Use was made of an electrolytic cell of the type described in Fig. 1, operating at about 0° C. A circular rotating nickel anode of the type previously described was employed in this cell. The initial charge was as follows:

| | Parts |
|---|---|
| Substantially anhydrous liquid HF | 360 |
| Di-n-butyl ether | 80 |

Additional ether was added during the run to replenish that consumed. Cell voltage was maintained at about 5.5 to 6.0 volts. Electrolysis was conducted for 24 hours and the cell then drained. The products obtained were washed with a potassium hydroxide solution to remove traces of HF and were then fractionally distilled. A substantial yield of $C_4F_9$—O—$C_4F_9$, di-n-nonafluorobutyl ether, was obtained. The yield of this product was substantially higher than that obtained from a static cell operated under similar conditions. There was also obtained a smaller yield of fusion products, for instance, $C_4F_{10}$, $C_3F_8$, $C_2F_6$, and $CF_4$ than obtained in static equipment indicating a lesser tendency to decompose primary products under stirred conditions.

It will, of course, be apparent to those skilled in the art that in addition to the fluorinatable organic compounds containing a carbon-bonded hydrogen employed in the previous examples, other fluorinatable organic compounds can be used without departing from the scope of the invention. Among additional chlorohydrocarbons, for example, which may be mentioned are $CH_3Cl$, $C_2H_5Cl$, $C_2H_4Cl_2$ (ethylene dichloride and its isomers), $C_2H_3Cl_2$ (including its isomers), $C_2H_2Cl_4$ (including its isomers), $C_2HCl_5$, $CH_2=CCl_2$, $CH_3$—$C(CH_3)$=$CHCl$
$CCl_3$—$CH$=$CH_2$, $CCl_3$—$C(CH_3)$=$CH_2$, $C_3H_6Cl_2$ $C_3H_4Cl_4$, etc. It will also be apparent that in addition to the chlorohydrocarbons consisting of carbon, hydrogen and chlorine mentioned above, other chlorohydrocarbons containing, in addition, fluorine atoms attached to carbon may also be used. As examples of such compounds may be mentioned $CHFCl_2$, $CH_2FCl$, $CH_3F_2Cl$, etc. Although the foregoing, as well as many other chlorohydrocarbons may be employed in the practice of my invention, I have found it advantageous to use as a starting material, that is, the chlorohydrocarbon, one which together with its reaction products, has such a boiling point range that the products are evolved from the cell as they are formed and most of the starting materials remain behind for further electrolysis. For instance, this fact is evident in connection with the electrolysis of methylene chloride ($CH_2Cl_2$—B. P. 40.1° C.) and chloroform ($CHCl_3$—B. P. 61.26° C.) where the major products are gases at cell operating temperatures, and the starting materials are liquids.

In addition to the n-octane of Example 7, other hydrocarbons and their derivatives may be employed in the process of my invention. In general, practically all organic compounds can be utilized as starting materials provided they contain at least one carbon-bonded hydrogen. Among additional hydrocarbons found suitable may be mentioned alicyclic hydrocarbons such as cyclobutane, cyclohexene, etc., and aromatic hydrocarbons including benzene, naphthalene, phenanthrene, etc., and alkylated and halogenated derivatives thereof. Additional examples of fluorinatable compounds that I may employ include the above-mentioned hydrocarbons containing polar groups attached thereto. Examples of such polar groups include nitro, cyano, hydroxyl, carboxyl, azo, alkoxy, acyloxy, amino, acetamino, amido, etc. Other oxygen-containing compounds useful in the process, in addition to the di-n-butyl ether of Example 8, include both the lower and higher homologous aliphatic ethers, aldehydes, ketones, etc.

The amount of ingredients used in my claimed process, i. e., the hydrogen fluoride, electrolyte, and fluorinatable compound may be varied within wide limits depending on the desired conductance in the cell. This conductance has been discussed generally above. The amount of electrolyte used is advantageously that which is substantially completely soluble in the mixture of anhydrous hydrogen fluoride and fluorinatable compound used. The minimum amount of hydrogen fluoride advantageously used is that stoichiometrically required for the desired conversion. The foregoing examples are indicative of the proportion of ingredients which may be used and are not intended to be limiting in their disclosures.

In my claimed process, although the examples disclose batch operation, certain distinct features allow continuous operation to be easily employed. One recommendation is the fact that, in many instances, substantially atmospheric pressures can be employed throughout, although reactions using superatmospheric pressures are also included within the scope of my claimed invention. When superatmospheric pressures are employed, higher temperatures than 19° C. as used at atmospheric pressure reactions may be employed. Thus, when working compounds where boiling points are above that of hydrogen fluoride and whose electrolysis products with hydrogen fluoride also boil above that of hydrogen fluoride, temperatures as high as 50° C., preferably from 20° to 35° C., may be employed without departing from the scope of the claimed invention. In addition, most of the products of the reaction, especially in the case of single carbon compounds, are highly volatile gaseous products at cell-operating temperatures and the compound being electrolyzed is generally a relatively non-volatile liquid at these same operating temperatures. It is therefore apparent that continuous addition of compound and anhydrous hydrogen fluoride could be made concurrently with the evolution of the reaction products.

What I claim as new and desire to secure by Letters Patent of the United States is:

1. The process of making fluorine-containing carbon compounds from a fluorinatable organic compound in an electrolysis cell provided with mechanical means for agitating the reaction mixture, which process comprises electrolyzing the aforesaid fluorinatable organic compound in liquid anhydrous HF while vigorously agitating the reaction mixture with the aforesaid agitating means at a rate sufficient to produce a reaction product comprising essentially fluorinated organic compounds, said reaction product containing a substantially higher percentage of primary reaction products than is obtained under static conditions.

2. The process for preparing fluorinated carbon compounds which comprises electrolyzing a vigorously stirred mixture of anhydrous liquid HF and an organic compound containing hydrogen bonded to a carbon atom in the molecule in an electrolysis cell provided with rotating stirring means, the degree of stirring induced by said rotating stirring means being sufficient to produce a reaction product containing a substantially higher percentage of primary reaction products than is obtained under static conditions.

3. The process for preparing fluorine-containing carbon compounds which process comprises the steps of electrolyzing a vigorously stirred mixture of ingredients comprising (1) a fluorinatable organic compounds containing hydrogen bonded to a carbon atom in the molecule, said electrolysis being performed in an electrolysis cell provided with rotating stirring means, the degree of stirring induced by said rotating stirring means being sufficient to produce a reaction product containing a substantially higher percentage of primary reaction products than is normally obtained under static conditions.

4. The process for preparing fluorine-containing carbon compounds from a fluorinatable organic compound containing carbon-bonded hydrogen, which process comprises forming a continuously vigorously stirred mixture of ingredients comprising (1) a fluorinatable organic compound herein described, (2) liquid anhydrous hydrogen fluoride and (3) an electrolyte in an electrolysis cell provided with mechanical stirring means, and thereafter passing a current through the mixture for a time sufficient to effect conversion of the aforesaid fluorinatable organic compound to a mixture comprising essentially fluorine-containing organic compounds in which there are present carbon-bonded fluorine atoms in place of carbon-bonded atoms present in the starting fluorinatable organic compound, the degree of stirring induced by said mechanical stirring means being sufficient to produce in said mixture a fluorine-containing organic compound a substantially higher percentage of primary reaction products than normally is obtained under static conditions.

5. The process for preparing fluorine-containing carbon compounds from a fluorinatable organic compound containing carbon-bonded hydrogen, which process comprises electrolyzing in an electrolysis cell a mixture of ingredients maintained in vigorously turbulent condition comprising (1) a fluorinatable organic compound described above, (2) liquid anhydrous hydrogen fluoride, and (3) an electrolyte, said turbulent condition being maintained by a rotating anode forming a part of said electrolysis cell, and recovering a reaction product comprising essentially fluorine-containing carbon compounds in which there are present carbon-bonded fluorine atoms in place of carbon-bonded hydrogen atoms present in the starting fluorinatable organic compound, the degree of agitation induced in said reaction mixture being adjusted at a rate sufficiently high to produce in the reaction product a substantially higher percentage of primary reaction products than normally is obtained under static conditions.

6. The process of preparing fluorine-containing chlorocarbon compounds in an electrolytic cell from a chlorohydrocarbon consisting solely of carbon, hydrogen and chlorine and containing carbon-bonded hydrogen, which process comprises electrolyzing a reaction mixture comprising (1) a chlorohydrocarbon described above, (2) liquid anhydrous hydrogen fluoride and (3) an electrolyte, said reaction mixture being constantly vigorously stirred by means of a rotating anode forming a part of said electrolysis cell, to produce a reaction product comprising essentially fluorine-containing chlorocarbon compounds in which there are present carbon-bonded fluorine atoms in place of carbon-bonded hydrogen atoms present in the starting chlorohydrocarbon, the stirring rate of said rotating anode being adjusted sufficiently high to produce in said reaction product a substantially higher percentage of primary reaction products than normally is obtained under static conditions.

7. The process of preparing fluorine-containing chlorocarbon compounds in an electrolysis cell from a chlorohydrocarbon consisting solely of carbon, hydrogen and chlorine and containing carbon-bonded hydrogen, which process comprises electrolyzing a reaction mixture comprising (1) trichloroethylene, (2) liquid anhydrous hydrogen flouride and (3) sodium fluoride, said reaction mixture being constantly vigorously stirred by means of a rotating anode forming a part of said electrolysis cell adjusted to a rotating speed sufficiently high to produce a reaction product comprising principally $CHFClCFCl_2$ and a minor proportion of $CF_2ClCFCl_2$, the percentage of $CHFClCFCl_2$ being substantially higher than normally is obtained under static conditions.

8. The process of preparing fluorine-containing chlorocarbon compounds in an electrolysis cell from a chlorohydrocarbon consisting solely of carbon, hydrogen and chlorine and containing carbon-bonded hydrogen, which process comprises electrolyzing a reaction mixture comprising (1) methylene chloride, (2) liquid anhydrous hydrogen fluoride and (3) lithium fluoride, said reaction mixture being constantly vigorously stirred by means of a rotating anode forming a part of said electrolysis cell, the rotating speed of said anode being sufficiently high to produce a reaction product predominating in $CHFCl_2$, and minor amounts of $CHF_2Cl$, $CF_2Cl_2$ and $CH_2FCl$, the percentage of $CHFCl_2$ obtained being substantially higher than normally obtained under static conditions.

9. The process for the electrochemical preparation of fluorinated derivatives of pyridine in an electrolysis cell, which process comprises electrolyzing a reaction mixture comprising pyridine and liquid anhydrous hydrogen fluoride, said reaction mixture being constantly vigorously stirred by means of a rotating anode adjusted to a rotating speed sufficiently high to produce a reaction product comprising essentially undecafluoropiperidine in a substantially higher yield than normally is obtained under static conditions.

10. The process for the electrochemical preparation of fluorinated derivatives of octane in an electrolysis cell, which process comprises electrolyzing a reaction mixture comprising octane, liquid anhydrous hydrogen fluoride and a small quantity of water, said reaction mixture being constantly vigorously stirred by mechanical stirring means adjusted to a rotating speed sufficiently high to produce a reaction mixture comprising essentially perfluorinated octane derivatives in a substantially higher yield than normally is obtained under static conditions.

11. The process for the electrochemical preparation of di-n-nonafluorobutyl ether in an electrolysis cell, which process comprises electrolyzing a reaction mixture comprising d-n-butyl ether and liquid anhydrous hydrogen fluoride, said reaction mixture being vigorously stirred during the entire reaction period by means of a rotating anode adjusted to a rotating speed sufficiently high to produce a reaction product comprising di-n-nonafluorobutyl ether in a higher yield than normally is obtained under static conditions.

References Cited in the file of this patent
UNITED STATES PATENTS 2,601,014     Wolfe _____ June 17, 1952

OTHER REFERENCES

"Electro-organic Chemistry," by Borckman (published in 1926), pages 3–6.